US012567189B2

(12) United States Patent
Jandial et al.

(10) Patent No.: US 12,567,189 B2
(45) Date of Patent: Mar. 3, 2026

(54) RELATIONAL LOSS FOR ENHANCING TEXT-BASED STYLE TRANSFER

(71) Applicant: Adobe Inc., San Jose, CA (US)

(72) Inventors: Surgan Jandial, Kashmir (IN); Simra Shahid, Uttar Pradesh (IN); Balaji Krishnamurthy, Uttar Pradesh (IN); Abhinav Java, Uttar Pradesh (IN); Shripad Deshmukh, Maharashtra (IN)

(73) Assignee: Adobe Inc., San Josec, CA (US)

( * ) Notice: Subject to any disclaimer, the term of this patent is extended or adjusted under 35 U.S.C. 154(b) by 122 days.

(21) Appl. No.: 18/657,567

(22) Filed: May 7, 2024

(65) Prior Publication Data

US 2025/0349050 A1     Nov. 13, 2025

(51) Int. Cl.
*G06T 11/60* (2006.01)
*G06F 40/47* (2020.01)

(52) U.S. Cl.
CPC .............. *G06T 11/60* (2013.01); *G06F 40/47* (2020.01); *G06T 2200/24* (2013.01)

(58) Field of Classification Search
CPC ...... G06T 11/60; G06T 2200/24; G06F 40/47
See application file for complete search history.

(56) References Cited

U.S. PATENT DOCUMENTS

2018/0082407 A1* 3/2018 Rymkowski ............ G06T 11/60
2018/0082715 A1* 3/2018 Rymkowski .......... G06V 20/10

2020/0380639 A1* 12/2020 Rossi ..................... G06N 3/045
2021/0383584 A1* 12/2021 Zhang ........................ G06T 3/40
2023/0022550 A1*  1/2023 Guo .......................... G06T 11/60
2023/0153606 A1*  5/2023 Min .......................... G06N 3/08
                                                                706/25
2023/0230198 A1*  7/2023 Zhang ..................... G06N 3/08
                                                                382/276
2024/0331235 A1* 10/2024 Smock ................... G16C 20/70

OTHER PUBLICATIONS

The Art Genome Project, Available online at: https://www.artsy.net/categories, Accessed from Internet on May 13, 2024, pp. 1-37.

(Continued)

*Primary Examiner* — YuJang Tswei

(74) *Attorney, Agent, or Firm* — Kilpatrick Townsend & Stockton LLP

(57) ABSTRACT

An image generation system accessing an input image displayed on a user interface. The image generation system receives, via the user interface, a target style text defining a target style for a stylized image to be generated based on the input image and a request to generate the stylized image. The image generation system generates the stylized image. Generating the stylized image includes applying a text guided image generation model to the input image and the target style text, wherein the text guided image generation model minimizes a loss between a first relationship between the generated stylized image and a set of style templates and a second relationship between the target style text and the set of style templates. The image generation system displays, via the user interface responsive to receiving the request, the generated stylized image.

20 Claims, 6 Drawing Sheets
(2 of 6 Drawing Sheet(s) Filed in Color)

(56) References Cited

OTHER PUBLICATIONS

Bai et al., ITstyler: Image-Optimized Text-based Style Transfer, Available online at: https://arxiv.org/pdf/2301.10916, Jan. 26, 2023, pp. 1-9.

Brown et al., Language Models are Few-Shot Learners, Available online at: https://dl.acm.org/doi/pdf/10.5555/3495724.3495883, Dec. 6, 2020, pp. 1-25.

Chen et al., DualAST: Dual Style-Learning Networks for Artistic Style Transfer, Proceedings of the Institute of Electrical and Electronics Engineers/Computer Vision Foundation, Conference on Computer Vision and Pattern Recognition, Jun. 2021, pp. 872-881.

Dumoulin et al., A Learned Representation for Artistic Style, Available online at: https://arxiv.org/abs/1610.07629, Feb. 9, 2017, pp. 1-26.

Fu et al., Language-Driven Artistic Style Transfer, In Computer Vision-European Conference on Computer Vision 2022: 17th European Conference, Oct. 23, 2022, pp. 1-17.

Gal et al., StyleGAN-NADA: CLIP-Guided Domain Adaptation of Image Generators, Available online at: https://arxiv.org/pdf/2108.00946, Dec. 16, 2021, pp. 1-25.

Gatys et al., Image Style Transfer Using Convolutional Neural Networks, In Proceedings of the Institute of Electrical and Electronics Engineers Conference on Computer Vision and Pattern Recognition, Jun. 2016, pp. 2414-2423.

Huang et al., Arbitrary Style Transfer in Real-Time with Adaptive Instance Normalization, Available Online at: https://openaccess.thecvf.com/content_ICCV_2017/papers/Huang_Arbitrary_Style_Transfer_ICCV_2017_paper.pdf, Mar. 2017, pp. 1501-1510.

Huang et al., DiffStyler: Controllable Dual Diffusion for Text-Driven Image Stylization, Available online at: https://arxiv.org/pdf/2211.10682, Dec. 18, 2023, pp. 1-14.

Huang et al., Language is Not All You Need: Aligning Perception with Language Models, Available online at: https://arxiv.org/pdf/2302.14045, Mar. 1, 2023, pp. 1-26.

Jandial et al., Gatha: Relational Loss for Enhancing Text-Based Style Transfer, Institute of Electrical and Electronics Engineers/Computer Vision Foundation, Conference on Computer Vision and Pattern, Jun. 2023, 6 pages.

Jing et al., Neural Style Transfer: A Review, Institute of Electrical and Electronics Engineers, Transactions on Visualization and Computer Graphics, vol. 26, No. 11, Oct. 30, 2018, pp. 1-25.

Johnson et al., Perceptual Losses for Real-Time Style Transfer and Super-Resolution, In European Conference on Computer Vision, Available Online at: https://arxiv.org/pdf/1603.08155.pdf%7C, Oct. 2016, pp. 694-711.

Kotovenko et al., A Content Transformation Block for Image Style Transfer, In Proceedings of the Institute of Electrical and Electronics Engineers/ Computer Vision Foundation, Conference on Computer Vision and Pattern Recognition, Jun. 2019, pp. 10032-10041.

Kwon et al., CLIPstyler: Image Style Transfer with a Single Text Condition, In Proceedings of the Institute of Electrical and Electronics Engineers/Computer Vision Foundation Conference on Computer Vision and Pattern Recognition, Jun. 2022, pp. 18062-18071.

Lia Literature Review of Neural Style Transfer, Available online at: https://www.cs.princeton.edu/courses/archive/spring18/cos598B/public/projects/LiteratureReview/COS598B_spr2018_NeuralStyleTransfer.pdf, Oct. 2018, pp. 4321-4329.

Li et al., BLIP: Bootstrapping Language-Image Pre-Training for Unified Vision-Language Understanding and Generation, Available online at: https://arxiv.org/pdf/2201.12086, Feb. 15, 2022, 12 pages.

Liu et al., Adaattn: Revisit Attention Mechanism in Arbitrary Neural Style Transfer, Available online at: https://arxiv.org/pdf/2108.03647, Aug. 11, 2021, 14 pages.

Liu et al., Name Your Style: An Arbitrary Artist-aware Image Style Transfer, Available online at: https://arxiv.org/pdf/2202.13562, Mar. 5, 2022, pp. 1-15.

Liu et al., Roberta: A Robustly Optimized Bert Pretraining Approach., Available online at: https://arxiv.org/pdf/1907.11692, Jul. 26, 2019, 13 pages.

Park et al., Arbitrary Style Transfer with Style-Attentional Networks, Available online at: https://arxiv.org/pdf/1812.02342, May 23, 2019, pp. 1-9.

Patashnik et al., StyleCLIP: Text-Driven Manipulation of StyleGAN Imagery, In Proceedings of the Institute of Electrical and Electronics Engineers/Computer Vision Foundation International Conference on Computer Vision, Mar. 31, 2021, pp. 2085-2094.

Radford et al., Learning Transferable Visual Models from Natural Language Supervision, In International Conference on Machine Learning, Feb. 26, 2021, 16 pages.

Ramesh et al., Zero-Shot Text-to-Image Generation, In International Conference on Machine Learning, Feb. 26, 2021, 11 pages.

Ronneberger et al., U-Net: Convolutional Networks for Biomedical Image Segmentation, International Conference on Medical Image Computing and Computer-Assisted Intervention, Available Online at URL: https://arxiv.org/pdf/1505.04597.pdf, May 18, 2015, pp. 234-241.

Saharia et al., Photorealistic Text-to-Image Diffusion Models with Deep Language Understanding, Available online at: https://arxiv.org/pdf/2205.11487, May 23, 2022, pp. 1-46.

Sanakoyeu et al., A Style-Aware Content Loss for Real-time HD Style Transfer, In Proceedings of the European Conference on Computer vision, Jul. 28, 2018, pp. 1-17.

Scao et al., Bloom: A 176B-Parameter Open-Access Multilingual Language Model, Available online at: https://arxiv.org/pdf/2211.05100, Nov. 9, 2022, pp. 1-62.

Singh et al., FLAVA: A Foundational Language and Vision Alignment Model, In Proceedings of the Institute of Electrical and Electronics Engineers/Computer Vision Foundation, Conference on Computer Vision and Pattern Recognition, Mar. 29, 2022, pp. 15638-15650.

Yanai et al., Conditional Fast Style Transfer Network, International Conference on Multimedia Retrieval, Jun. 6-9, 2017, pp. 434-437.

Yang et al., XLNet: Generalized Autoregressive Pretraining for Language Understanding, Available online at: https://arxiv.org/pdf/1906.08237, Jan. 2, 2020, pp. 1-18.

Zhan et al., Multimodal Image Synthesis and Editing: A Survey, Institute of Electrical and Electronics Engineers, Transactions on Pattern Analysis and Machine Intelligence, Dec. 27, 2021, pp. 1-20.

* cited by examiner

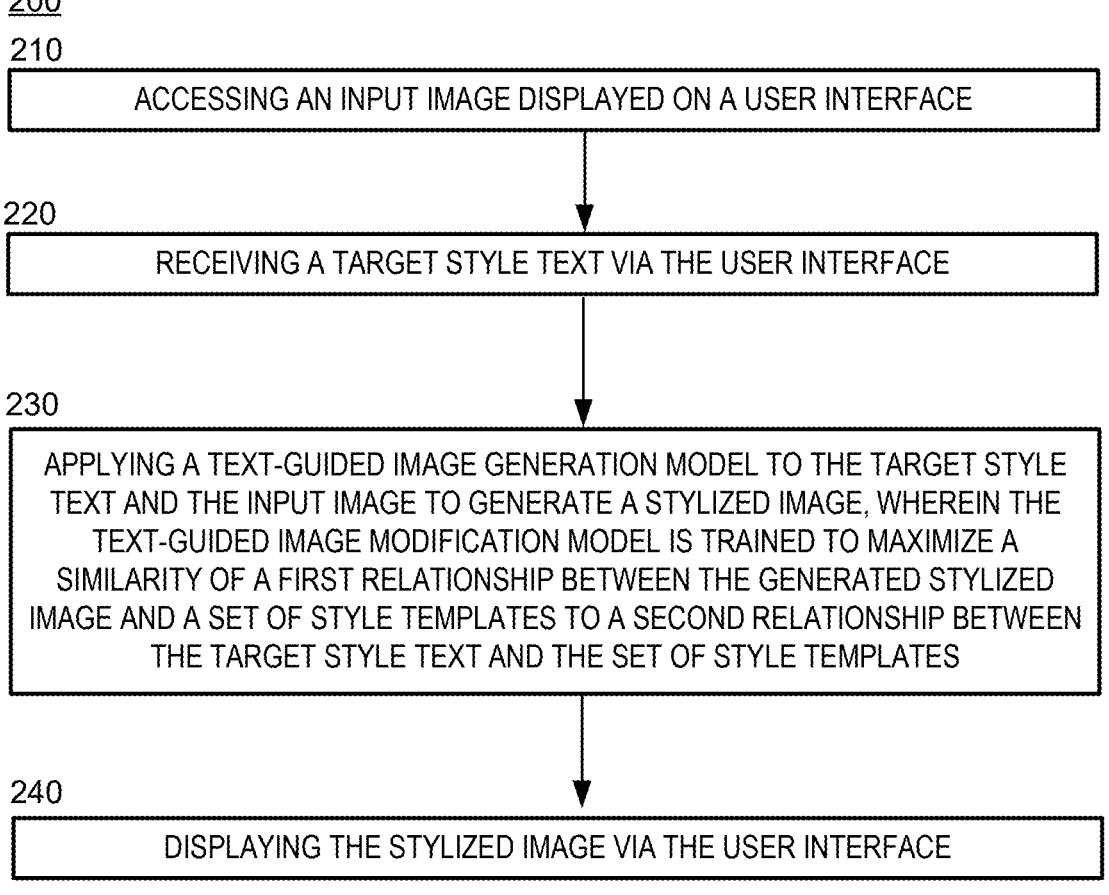

200

210

ACCESSING AN INPUT IMAGE DISPLAYED ON A USER INTERFACE

220

RECEIVING A TARGET STYLE TEXT VIA THE USER INTERFACE

230

APPLYING A TEXT-GUIDED IMAGE GENERATION MODEL TO THE TARGET STYLE TEXT AND THE INPUT IMAGE TO GENERATE A STYLIZED IMAGE, WHEREIN THE TEXT-GUIDED IMAGE MODIFICATION MODEL IS TRAINED TO MAXIMIZE A SIMILARITY OF A FIRST RELATIONSHIP BETWEEN THE GENERATED STYLIZED IMAGE AND A SET OF STYLE TEMPLATES TO A SECOND RELATIONSHIP BETWEEN THE TARGET STYLE TEXT AND THE SET OF STYLE TEMPLATES

240

DISPLAYING THE STYLIZED IMAGE VIA THE USER INTERFACE

FIG. 2

RELATIONAL LOSS FOR ENHANCING TEXT-BASED STYLE TRANSFER

TECHNICAL FIELD

This disclosure generally relates to techniques for generating stylized images using text-guided image modification models. More specifically, but not by way of limitation, this disclosure relates to improvements for generating a stylized image by applying a text-guided image modification model to an input image and a target style text.

BACKGROUND

Conventional image generation systems can generate stylistic images from an input image and a target style text defining a target style for modifying the input image.

SUMMARY

The present disclosure describes techniques for generating a stylized image by applying a text-guided image generation model to an input image and a target style text. An image generation system accessing an input image displayed on a user interface. The image generation system receives, via the user interface, a target style text defining a target style for a stylized image to be generated based on the input image and a request to generate the stylized image. The image generation system generates the stylized image. Generating the stylized image includes applying a text guided image generation model to the input image and the target style text, wherein the text guided image generation model minimizes a loss between a first relationship between the generated stylized image and a set of style templates and a second relationship between the target style text and the set of style templates. The image generation system displays, via the user interface responsive to receiving the request, the generated stylized image.

Various embodiments are described herein, including methods, systems, non-transitory computer-readable storage media storing programs, code, or instructions executable by one or more processing devices, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

FIG. 2 depicts a method for generating a stylized image by applying a text-guided image generation model to an input image and a target style text, according to certain embodiments disclosed herein.

DETAILED DESCRIPTION

Figure 1:
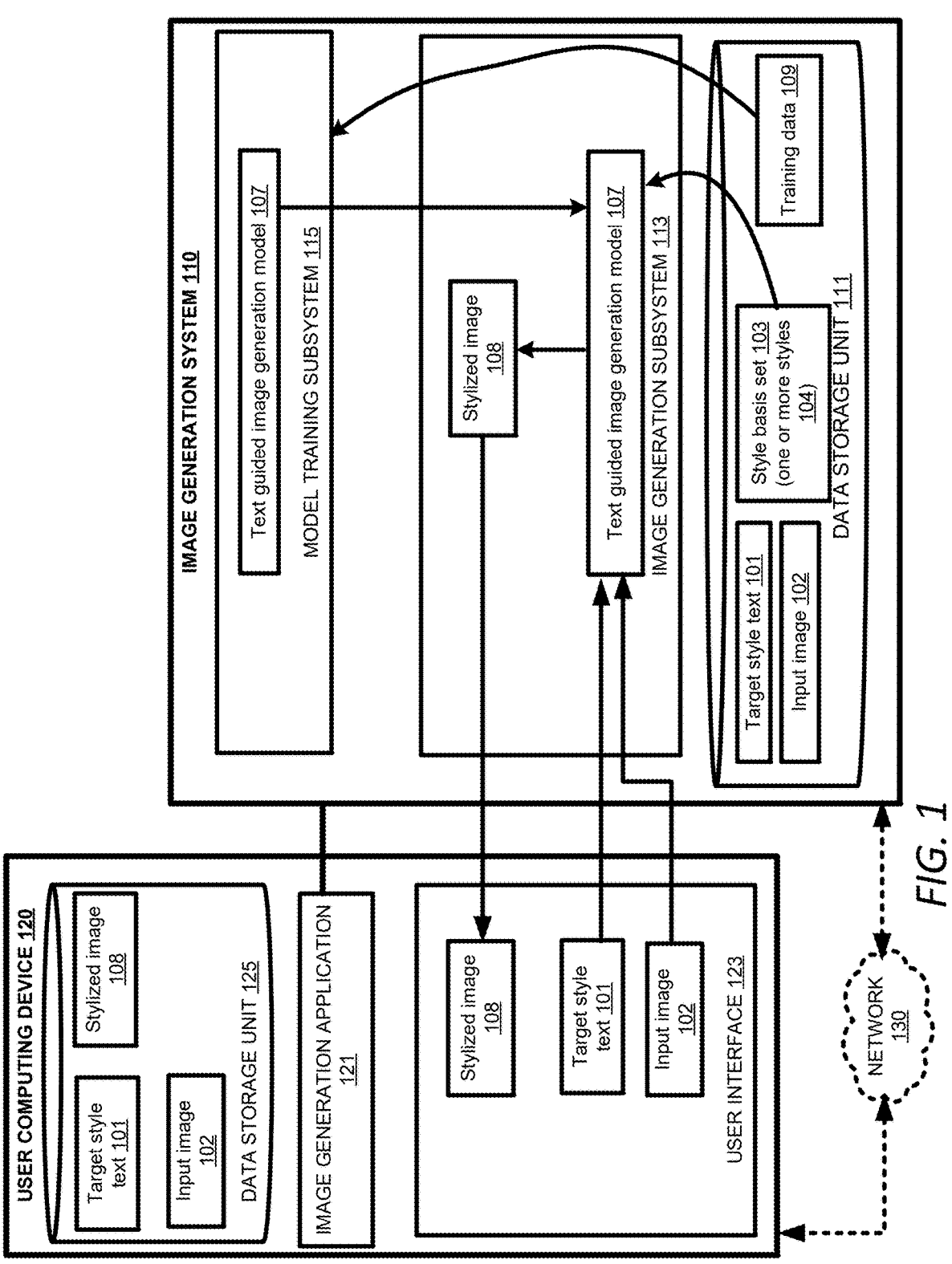
FIG. 1 depicts an example of a computing environment for generating a stylized image by applying a text-guided image generation model to an input image and a target style text, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Conventional image generation systems can generate stylistic images from an input image and a target style text defining a target style for modifying the input image. Examples of styles include but are not limited to a cartoon style, a polaroid style, a rustic style, a minimalist style, a hipster style. A style may define particular features of an image including one or more of color, texture, line, space, shape, value, form, or other features. However, conventional text-based style transfer techniques are image driven approaches and do not account for the subjective nature of target style text descriptions or the nuances of style-specific vocabulary during the optimization process. Convention image driven approaches base their solution on aligning the target style text input and image embeddings. In other words, such conventional image generation systems direct the output stylized image to be faithful to the direction of the text. However, such moving of the output stylized image in the direction of the input style text input vector does not ensure that a relationship between the output stylized image and the style is the same as a relationship between the input style text input and the style. Using such conventional techniques therefore severely limits the range of stylistic expression.

Certain embodiments described herein address the limitations of conventional image generation systems by incorporating a relational loss to style-transfer-based image generation models. Specifically, the text guided image generation model described herein introduces a loss function that enforces a relationship between stylized images and a proxy style set to be similar to a relationship between the target style text and the proxy style set. In other words, the text guide image generation model described herein ensures that a relation (e.g., a similarity) of a set of well-known style templates with the stylized output image should match the relation of the set of well-known style templates with the proxy style text. The proxy style set in the text guided image generation model described herein uses a natural language style vocabulary that accounts for the subjective nature of style descriptions which is superior to the rigid categories used in conventional approaches because it allows consideration of complex compositions. Ensuring this relationship between the natural language based proxy style set and each of the target style text and stylized image supports and enables the image generation system to provide improved stylized images compared to stylized images generated using conventional text-guided stylized image generation methods. For example, given an input image and an input target style text, the stylized images generated using the text guided image generation model described herein increase both a preservation of style understanding and a realism in its generated stylized images compared to the stylized images generated using conventional models from the same input image and input target style text.

The following non-limiting example is provided to introduce certain embodiments. In this example, an image generation system accesses an input image displayed on a user interface. In some instances, a user captures an image via a user computing device or otherwise accesses a stored image via the user computing device. The user selects an image generation application via the user interface and the image generation application displays the captured or accessed input image. For example, the displayed input image is an image of the user captured via a camera component of the user computing device.

The image generation system receives a target style text input via the user interface. For example, the user selects a user interface object on the user interface and inputs a target style text input for performing a style transfer on the displayed input image. For example, performing the style transfer involves generating a stylized image that is similar to the displayed input image in a style defined by the target style text input. In some instances, the target text input comprises a natural language description of the user's desired target style for the stylized image. For example, the user inputs a target style text reading "cartoon" or "I want this image as a cartoon" and the image generation system receives the target style text input. By inputting "cartoon" or "I want this image as a cartoon" as the target style text input via the user interface, the user requests generation of a stylized image that resembles the input image but that is in a cartoon style. In some instances, the image generation system receives a selection of a user interface object that requests generation of a stylized image based on the input image and the target style text input that was entered by the user.

Figures 3, 4:
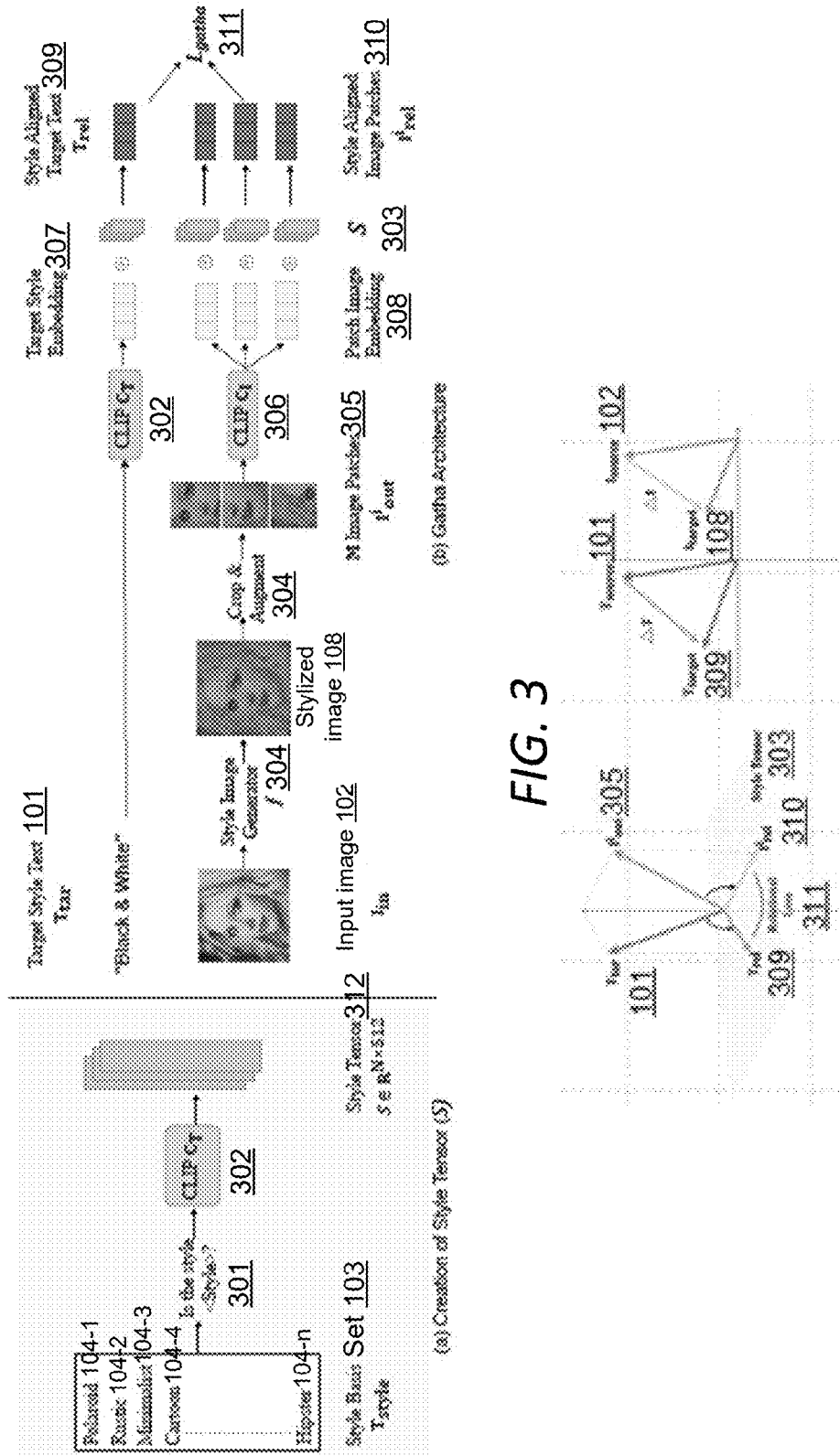
FIG. 3 illustrates a text-guided image generation model, according to certain embodiments disclosed herein.
FIG. 4 illustrates an example relational loss for use with a text-guided image generation model compared to a directional loss, according to certain embodiments disclosed herein.

The image generation system applies a text-guided image generation model to the target style text input and the input image to generate a stylized image. Continuing with the example in which the input image is an image of the user and the target style text input specifies a "cartoon" style, the stylized image generated using the text guided image generation model resembles the input image of the user but is in the target cartoon style specified by the target style text input. The image modification model is trained to maximize a similarity of a first relationship between the generated stylized image and a set of style templates is similar to a second relationship between the target style text and the set of style templates. In some instances, the text guided image generation model described herein uses a loss function that enforces a relationship between stylized images and a proxy style set to be similar to a relationship between the target style text and the proxy style set. A method for generating a stylized image by applying a text-guided image generation model to an input image and a target style text is described in FIG. 2. A text guided image generation model is illustrated in FIG. 3. FIG. 4 illustrates an example relational loss for use with a text-guided image generation model compared to a directional loss.

The image generation system displays the stylized image via the user interface. For example, the image generation system displays the stylized image responsive to receiving the target style text input via the user interface. Continuing with the example in which the input image is an image of the user and the target style text input specifies a "cartoon" style, the image generation system displays, via the user interface, a stylized image resembling the input image depicting the user but in a cartoon style.

Figure 5:
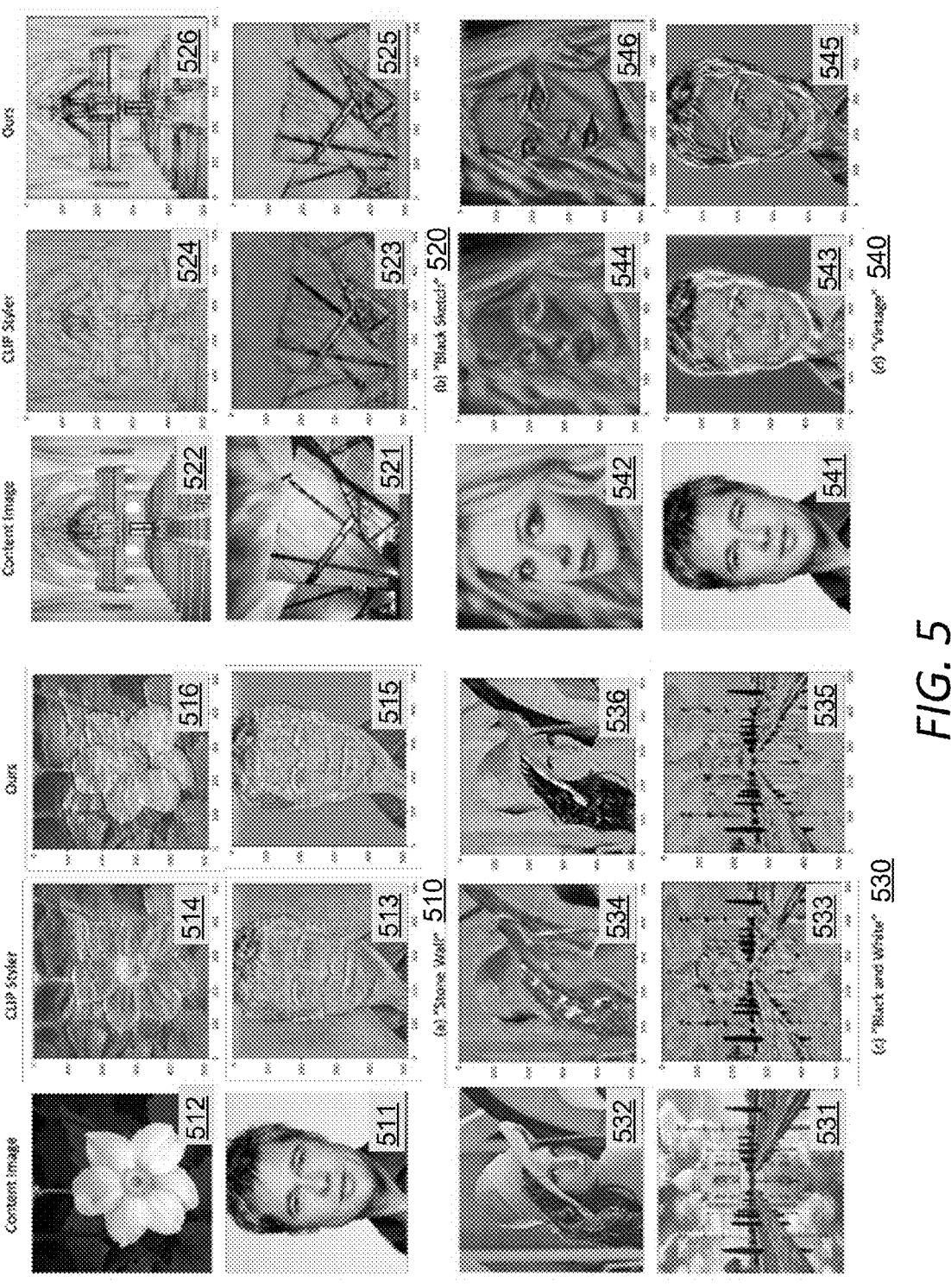
FIG. 5 illustrates a comparison between example stylized images generated using the text-guided image generation model described herein compared to example stylized image outputs generated using conventional text-guided image generation models, according to certain embodiments disclosed herein.

The embodiments described herein, specifically including the relational loss function that enforces a relationship between stylized images and a proxy style set (e.g., a predefined list of styles) to be similar to a relationship between the target style text and the proxy style set, significantly improves the realism and target style preservation in generated stylized images. As previously discussed, conventional text guided image generation models do not include such a relational loss function as described herein. Ensuring this relationship between the proxy style set and each of the target style text and stylized image supports and enables the image generation system described herein to provide improved stylized images compared to stylized images generated using conventional text-guided stylized image generation methods. For example, given an input image and an input target style text, the stylized images generated using the text guided image generation model described herein increase both a preservation of target style and a realism in its generated stylized images compared to the stylized images generated using conventional models from a same input image and input target style text. FIG. 5 illustrates how the text guided image generation model described herein provides superior stylized images compared to stylized images generated from conventional models based on the same input image and target style text input.

Example Operating Environment for Generating a Stylized Image by Applying a Text-Guided Image Generation Model to an Input Image and a Target Style Text Referring now to the drawings, FIG. 1 depicts an example of a computing environment 100 for generating a stylized image 108 by applying a text-guided image generation model 107 to an input image 102 and a target style text 101, in accordance with certain embodiments described herein. The computing environment 100 includes an image generation system 110, which can include one or more processing devices that execute an image generation subsystem 113 and a model training subsystem 115. In certain embodiments, each of the image generation subsystem 113 and the model training subsystem 115 is a network server or other computing device connected to a network 130. In certain embodiments, the image generation system 110 operates on the user computing device 120. For example, the image generation application 121 may perform one or more operations described herein as being performed by the image generation system 110.

The image generation subsystem 113 accesses or otherwise receives an input image 102 and a target style text 101. In some instances, a user captures an image via the user computing device 120 or otherwise accesses a stored image (e.g., from the data storage unit 125, data storage unit 111, or other data storage unit or memory) via the user computing device 120. In some instances, the image generation subsystem 113 displays, via the user interface 123 of the user computing device 120, the input image 102 and a user interface 123 object for receiving an input of a target style text 101. In some instances, the image generation subsystem 113 receives the target style text 101 input by the user at the user interface 123 object. The input of the target style text 101 can be a free text input entered via the user interface object 123 (e.g., a menu or selection user interface object). The target style text 101 specifies a target style 104 (e.g., a cartoon style, a black and white style, an impressionistic style) for rendering a stylized image 108 based on the input image 102. In some instances, the target style text 101 is a very specific custom target style entered by the user, for example "modern and presidential with bold colors." The image generation subsystem 113 generates the stylized image 108 by applying a text guided image generation model 107 to the target style text 101 and the input image 102. FIG. 2 depicts an example of a method for generating a stylized image 108 by applying a trained text-guided image generation model 107 to an input image 102 and a target style text 101. FIG. 3 depicts an example of a text guided image generation model 107. The image generation subsystem 113 displays, via the user interface 123 responsive to receiving the target style text 101, the generated stylized image 108.

The model training subsystem 115 trains the text guided image generation model 107 using a set of training data 109. In some instances, the training data 109 comprise a set of target styles 104 (a style basis set 103) that can be used for training the text guided image generation model 107. In some instances, the training data 109 can include one or more base images and, for each of the one or more base images, a set of stylized images 108 associated with the base image, each of the set of stylized images 108 resembling the base image but being in a respective distinct style 104 of the style basis set 103. In some embodiments, the model is pretrained from a set of different images. In other embodiments, the model is instead trained by a single image. The single image may be the same input image that is to be stylized.

The image generation system 110 includes a data storage unit 111. An example data storage unit 111 is accessible to the image generation system 110 and stores data for the image generation system 110. In some instances, the data storage unit 111 stores one or more stock images, images captured via the user computing device 120, and/or images accessed via the network 130 which can be used as input images 102. In some instances, the image generation system 110 stores one or more target style texts 101 that can be presented via the user interface 123 for selection of a particular target style text 101 from among the presented one or more target style texts 101. In some instances, the data storage unit 111 stores one or more stylized images 108 generated by the image generation system 110. In some instances, the data storage unit 111 stores a style basis set 103 (a set of styles 104) and other training data 109 that can be used by the model training subsystem 115 to train the text guided image generation model 107.

An example user computing device 120 includes an image generation application 121, a user interface 123, and a data storage unit 125. In certain embodiments, the user computing device 120 is a smart phone device, a personal computer (PC), a tablet device, or other user computing device 120. In some embodiments, the user computing device 120 communicates with the image generation system 110 via the network 130. In some embodiments, the image generation system 110 is a component of the image generation application 121.

The image generation application 121, in some embodiments, is associated with the image generation system 110 and the user downloads the image generation application 121 on the user computing device 120. For example, the user accesses an application store or a website of the image generation system 110 using the user computing device 120 and requests to download the image generation application 121 on the user computing device 120. The image generation application 121 operates on the user computing device 120 and enables a user of the user computing device 120 to enter, select, or otherwise provide a target style text 101 and input image 102 via the user interface 123. The image generation application 121 enables the user to interact, via the user interface 123 with the image generation system 110. The image generation application 121 can communicate with the user interface 123 to receive one or more inputs from the user. The image generation application 121 can instruct the user interface 123 to display a stylized image 108 generated using the text guided image generation model 107. In some embodiments, the image generation application 121 communicates with one or more of the image generation subsystem 113, the model training subsystem 115, or the data storage unit 111 of the image generation system 110. In certain embodiments, the image generation application 121 includes the image generation subsystem 113 and the model training subsystem 115 and performs the operations described herein as being performed by the subsystems 113 and 115.

The user interface 123 can include a touchscreen display interface, a display device (e.g. a monitor) with a separate input device (e.g. a mouse), or other user interface 123 which can receive one or more inputs from the user and display information or provide other output to the user. In some instances, the user interface 123 receives one or more inputs from the user to access an input image 102 and display the input image 102. In some instances, the user interface 123 receives one or more inputs from the user to enter, select, or retrieve a target style text 101. The user interface 123 can display a stylized image 108 generated by the image generation system 110, where the image generation system 110 applies the text guided image generation model 107 to the input image 102 and target style text 101 to generate the stylized image 108.

The data storage unit 125 is accessible to the user computing device 120 and stores data for the user computing device 120. In some instances, the data storage unit 125 the data storage stores one or more stock images, images captured via the user computing device 120, and/or images accessed via the network 130 which can be used as input images 102. In some instances, the data storage unit 125 stores one or more target style texts 101 that can be presented via the user interface 123 for selection of a particular target style text 101 from among the presented one or more target style texts 101. In some instances, the data storage unit 125 stores one or more stylized images 108 generated by the image generation system 110. For example, the image generation system 110 can access data stored in the data storage unit 125 via the network 130.

The image generation system 110, including the image generation subsystem 113 and the model training subsystem 115, may be implemented using software (e.g., code, instructions, program) executed by one or more processing devices (e.g., processors, cores), hardware, or combinations thereof. The software may be stored on a non-transitory storage medium (e.g., on a memory component). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the image generation system 110 can be implemented using more or fewer systems or subsystems than those shown in FIG. 1, may combine two or more subsystems, or may have a different configuration or arrangement of the systems or subsystems.

Examples of Computer-Implemented Operations for Generating a Stylized Image by Applying a Text-Guided Image Generation Model to an Input Image and a Target Style Text In the embodiments described herein, the image generation system 110 can generate a stylized image 108 by applying a text guided image generation model 107 to an input image 102 and a target style text 101 for the input image 102 that defines a style for the stylized image 108

FIG. 2 illustrates a method 200 for generating a stylized image 108 by applying a text-guided image generation model 107 to an input image 102 and a target style text 101, according to certain embodiments disclosed herein. One or more computing devices (e.g., the image generation system 110 or the individual subsystems 113 and 115 contained therein) implement operations depicted in FIG. 2. For illustrative purposes, the method 200 is described with reference to certain examples depicted in the figures. Other implementations, however, are possible.

At block 210, the method 200 involves accessing, by the image generation system 110, an input image 102 displayed on a user interface 123. For example, the input image 102 is stored in the data storage unit 111 and the image generation system 110 accesses the input image 102 from the data storage unit 111. In some instances, the user of the user computing device 120 captures the input image 102 via a camera component of the user computing device 120 or otherwise accesses a stored image via the user computing device 120. In some instances, the image generation application 121 displays the captured or otherwise accessed input image 102. For example, the displayed input image 102 is an image of the user captured via a camera component of the user computing device 120. In some instances, the input image 102 is an image of a building, a nature scene, an object, a room, or other subject depicted in the image.

At block 220, the method 200 involves receiving, by the image generation system 110, a target style text 101 via the user interface 123. In some instances, the image generation subsystem 113 displays, via the user interface 123 of the user computing device 120, the input image 102 and a user interface 123 object for receiving an input of a target style text 101. In some instances, the image generation subsystem 113 receives the target style text 101 input by the user at the user interface 123 object. The input of the target style text 101 can be a natural language text input. For example, the target style text 101 can read "Batman," "face painting of a cheering fan," "minimalist design with sleek lines and cool colors," "bold colors combined with unconventional patterns for a modern look," or other unique style specified by the user in the target style text 101. The target style text 101 specifies a target style 104 (e.g., a cartoon style, a black and white style, an impressionistic style, or other style) for rendering a stylized image 108 based on the input image

102. A target style may define a specific combination of features of an image including one or more of color, texture, line, space, shape, value, form, or other features.

At block 230, the method 200 involves applying, by the image generation system 110, a text guided image generation model 107 to the target style text 101 and the input image 102 to generate a stylized image 108, wherein the text guided image modification model 107 is trained to maximize a similarity of a first relationship between the generated stylized image 108 and a set of style templates to a second relationship between the target style text 101 and the set of style templates. For example, the set of style templates comprises the style basis set 103. In some instances, the text guided image generation model 107 described herein uses a loss function that enforces a relationship between stylized images and the style basis set 103 to be similar to a relationship between the target style text and the style basis set 103. Further details about the text guided image generation model 107 are described in FIG. 3.

At block 240, the method 200 involves displaying, by the image generation model 107, the stylized image via the user interface 123. For example, the image generation system 110 displays the stylized image 108 responsive to receiving the target style text 101 input via the user interface 123. Continuing with the example in which the input image 101 is an image of the user and the target style text input specifies a "cartoon" style, the image generation system displays, via the user interface, a stylized image 108 resembling the input image 101 depicting the user but in a cartoon style.

FIG. 3 depicts an example text guided image generation model 107, according to certain embodiments described herein. For illustrative purposes, the method 300 is described with reference to certain examples depicted in the figures. Other implementations, however, are possible. As depicted in FIG. 3, the image generation system 110 generates a style tensor 112 from a style basis set 103. FIG. 3 depicts an example style basis set 103 including n styles 104, comprising polaroid 104-1, rustic 104-2, minimalist 104-3, cartoon 104-4, . . . hipster 104-n. In certain embodiments, the style basis set 103 comprises a predefined number (e.g. 100, 250, 261, 280, 300) commonly used style 104 templates from popular design platforms.

For each of the style 104 templates, the image generation system 110 preprocesses the respective style 104 template into a question format by prompting the respective style 104 using the query template 301. In some instances, as depicted in FIG. 3, the query template 301 reads "is this the style?" The image generation system 110 further embeds the output of the query template 301 using a Contrastive Language-Image Pretraining CLIP encoder ($C_T$) 302 to generate a set of clip codes that form the style tensor(s) 312. The style tensor 312 has dimensions of N× 512, where N is the predefined number of style 104 templates in the style basis set 103. For example, the image generation system 110 encodes the style basis set 103 in a style tensor(S) 312 using the CLIP encoder ($C_T$) as follows:

$$S = C_T(T_{style}) \in \mathcal{R}^{N \times 512} \tag{1}$$

The text-guided style transfer described herein allows consideration of custom natural language text prompts.

As depicted in FIG. 3, the target style text 101 ($T_{tar}$), which reads "Black & White," is input to the CLIP encoder 302 to generate a target style embedding 307. The target style embedding 307 is projected over the style tensor 312 to generate a style aligned target text score (T$_{rel}$) 309, where:

$$T_{rel} = S_{N \times 512} \times (C_T(T_{tar}))^T {}_{512 \times 1} \qquad (2)$$

T$_{rel}$ ∈ R$^{N \times 1}$ is a relation vector independent of the embedding dimension of the visual language model (VLM), where N is the predefined number of style 104 templates in the style basis set 103.

The input image 102 (I$_{in}$) is input to a style image generator 304 (f) to generate the stylized image 108. For example, the input image 102 comprises a red-green-blue (RGB) color value for each pixel of a set of pixels. From the stylized image 108, the image generation system 110 generates a set of m image patches 305 (I$^i_{out}$) and encodes each of the set of patches 305 independently. Each of the m image patches 305 is augmented and a respective patch image embedding 308 (CLIP image embedding C$_I$(aug(I$^i_{out}$)) is generated using the CLIP encoder 302, for a total of m patch image embeddings 308. A similarity score (I$^i_{rel}$) for m style aligned image patches 310 is generated by encoding the patch image embeddings 308 in the style tensor(S) 312 using the CLIP encoder (C$_T$) as follows:

$$I^i_{rel} = S_{N \times 512} \times \left(C_I\left(aug(I^i_{out})\right)\right)^T {}_{512 \times 1} \qquad (3)$$

The image generation system 110 applies a loss function to the style aligned target text 309 and style aligned image patches 310 to determine a relational loss (L$_{gatha}$) 311, which enforces a relational constraint in a proxy manifold of the style tensor 112 that improves the text guided image generation model's 107 discriminative ability. For example, the relational loss (L$_{gatha}$) 311 can be measured as the mean squared error between the stylized image 108 and the text style relation vector T$_{rel}$ averaged over all stye aligned image patches 310, as follows:

$$L_{gatha} = \frac{1}{M} \sum_{l=1}^{M} \left\| I^i_{rel} - T_{rel} \right\|_2^2 \qquad (4)$$

FIG. 4 illustrates an example relational loss 311 for use with a text-guided image generation model 107 compared to a directional loss 401, according to certain embodiments described herein. For illustrative purposes, FIG. 4 is described with reference to certain examples depicted in the figures. Other implementations, however, are possible. Portion (a) of FIG. 4 depicts that the relational loss 311 (L$_{gatha}$), is computed in vector terms. The image vectors 305 and 310 and text vectors 101 and 309 are projected to a Style Space, and the relational loss 311 computes the distance between them in this manifold.

Portion (b) of FIG. 4 shows the directional loss 401, where the vector connecting the generated (108) and source (102) images ΔI is required to be parallel to the vector connecting the source (101) and target text (309), ΔT. For example, the directional loss 401 represents a cosine difference of direction vectors of text and image modalities. For example, unit vector joining clip text embeddings T$_{in}$, the placeholder textual description of content image I$_{in}$ (e.g., "a photo"), and T$_{tar}$ (the user-specified target style text 101) description (e.g., "A vintage photo of Brad Pitt") are determined, respectively. Likewise, unit vector joining clip image embeddings of I$_{in}$ and its desired stylized output I$_{out}$=f(I$_{in}$) are computed, respectively. Mathematically, if C$_I$ and C$_T$ denote the clip image and text encoders, the direction vectors are given as:

$$T_{dir} = \frac{C_T(T_{tar}) - C_T(T_{in})}{\|C_T(T_{tar}) - C_T(T_{in})\|_2} \qquad (5)$$

$$I_{dir} = \frac{C_I(I_{out}) - C_I(I_{in})}{\|C_I(I_{out}) - C_I(I_{in})\|_2} \qquad (6)$$

Accordingly, the directional loss (L$_{dir}$) 401 is then given by:

$$L_{dir} = 1 - T_{dir} \cdot I_{dir} \qquad (7)$$

In some instances, the directional loss 401 can be applied at two levels: a global image level (L$_{dir}^{glob}$) and an image patch level (L$_{dir}^{patch}$). The relational loss 311 described herein is an improvement over the directional loss 401 because the relational loss 311 captures nuanced relationships between image and text descriptions that are not captured by the directional loss 401 typically used in conventional image generation models. Because the text guided image generation model 107 described herein captures this nuanced relationship, its discriminative ability is improved over the conventional image generation models.

FIG. 5 illustrates a comparison between example stylized images generated using the text-guided image generation model described herein compared to example stylized image outputs generated using conventional text-guided image generation models, according to certain embodiments disclosed herein. For illustrative purposes, the FIG. 5 is described with reference to certain examples depicted in the figures. Other implementations, however, are possible. FIG. 5 depicts a qualitative comparison of stylized images 108 generated from combinations of different target input texts 101 (510, 520, 530, and 540) and input images 102 (511, 512, 531, 532, 521, 522, 541, 542) using the text guided image generation model 107 described herein and a conventional text guided image generation model (CLIP styler). See, "Clipstyler: Image Style Transfer with a Single Text Condition," Kwon, Gihyun and Ye, Jong Chul, arXiv preprint arXiv: 2112.00374, 2021, available at https://github-.com/cyclomon/CLIPstyler under the MIT license.

For example, FIG. 5 depicts stylized image 516 generated using the text guided image generation model 108 and CLIP styler stylized image 514 generated from the conventional CLIP styler model, where both models are applied to the same input image 512 and input text 510 ("stone wall"). Stylized image 515 is generated using the text guided image generation model 108 and CLIP styler stylized image 513 is generated from the conventional CLIP styler model, were both models are applied to the same input image 511 and input text 510 ("stone wall"). For example, FIG. 5 depicts stylized image 536 generated using the text guided image generation model 108 and CLIP styler stylized image 534 generated from the conventional CLIP styler model, were both models are applied to the same input image 532 and input text 530 ("black and white"). For example, FIG. 5 depicts stylized image 535 generated using the text guided image generation model 108 and CLIP styler stylized image 533 generated from the conventional CLIP styler model, were both models are applied to the same input image 531 and input text 530 ("black and white"). For example, FIG.

5 depicts stylized image 526 generated using the text guided image generation model 108 and CLIP styler stylized image 524 generated from the conventional CLIP styler model, were both models are applied to the same input image 522 and input text 520 ("black sketch"). For example, FIG. 5 depicts stylized image 525 generated using the text guided image generation model 108 and CLIP styler stylized image 523 generated from the conventional CLIP styler model, were both models are applied to the same input image 521 and input text 520 ("black sketch"). For example, FIG. 5 depicts stylized image 546 generated using the text guided image generation model 108 and CLIP styler stylized image 544 generated from the conventional CLIP styler model, were both models are applied to the same input image 542 and input text 540 ("vintage"). For example, FIG. 5 depicts stylized image 545 generated using the text guided image generation model 108 and CLIP styler stylized image 543 generated from the conventional CLIP styler model, were both models are applied to the same input image 541 and input text 540 ("vintage"). As can be seen in the comparison between the stylized images 516, 515, 536, 535, 526, 525, 546, and 545, generated using the text guided image generation model 107 described herein and the corresponding stylized images 514, 513, 534, 533, 524, 523, 544, and 543, respectively, the stylized images 516, 515, 536, 535, 526, 525, 546, and 545 better preserve a style understanding and are more realistic when compared to the corresponding input images 521, 511, 532, 531, 522, 521, 542, and 541, respectively.

Examples of Computing Environments for Implementing Certain Embodiments

Figure 6:
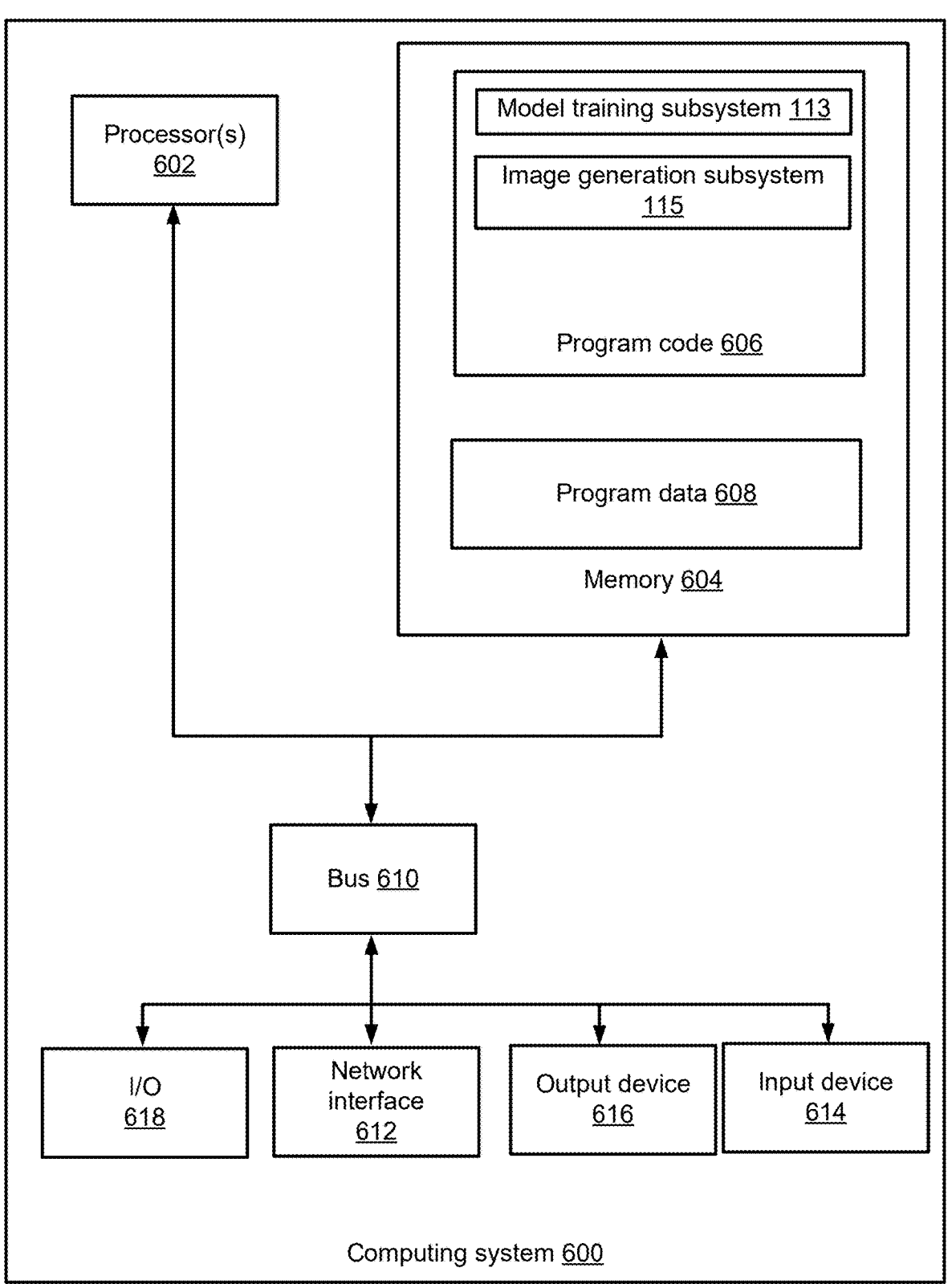
FIG. 6 depicts an example of a computing system that performs certain operations described herein, according to certain embodiments disclosed herein.

Any suitable computer system or group of computer systems can be used for performing the operations described herein. For example, FIG. 6 depicts an example of a computer system 600. The depicted example of the computer system 600 includes a processing device 602 communicatively coupled to one or more memory components 604. The processing device 602 executes computer-executable program code stored in a memory components 604, accesses information stored in the memory component 604, or both. Execution of the computer-executable program code causes the processing device to perform the operations described herein. Examples of the processing device 602 include a microprocessor, an application-specific integrated circuit ("ASIC"), a field-programmable gate array ("FPGA"), or any other suitable processing device. The processing device 602 can include any number of processing devices, including a single processing device.

The memory components 604 includes any suitable non-transitory computer-readable medium for storing program code 606, program data 608, or both. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory components 604 can be volatile memory, non-volatile memory, or a combination thereof.

The computer system 600 executes program code 606 that configures the processing device 602 to perform one or more of the operations described herein. Examples of the program code 606 include, in various embodiments, the scene modeling system 110 (including the image generation subsystem 113 and the model training subsystem 115) of FIG. 1, which may include any other suitable systems or subsystems that perform one or more operations described herein (e.g., one or more neural networks, encoders, attention propagation subsystem and segmentation subsystem). The program code 606 may be resident in the memory components 604 or any suitable computer-readable medium and may be executed by the processing device 602 or any other suitable processor.

The processing device 602 is an integrated circuit device that can execute the program code 606. The program code 606 can be for executing an operating system, an application system or subsystem, or both. When executed by the processing device 602, the instructions cause the processing device 602 to perform operations of the program code 606. When being executed by the processing device 602, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory components 604 store the program data 1208 that includes one or more datasets described herein. In some embodiments, one or more of data sets are stored in the same memory component (e.g., one of the memory components 604). In additional or alternative embodiments, one or more of the programs, data sets, models, and functions described herein are stored in different memory components 604 accessible via a data network. One or more buses 610 are also included in the computer system 600. The buses 610 communicatively couple one or more components of a respective one of the computer system 1200.

In some embodiments, the computer system 600 also includes a network interface device 612. The network interface device 612 includes any device or group of devices suitable for establishing a wired or wireless data connection to one or more data networks. Non-limiting examples of the network interface device 612 include an Ethernet network adapter, a modem, and/or the like. The computer system 600 is able to communicate with one or more other computing devices via a data network using the network interface device 612.

The computer system 600 may also include a number of external or internal devices, an input device 614, a presentation device 616, or other input or output devices. For example, the computer system 600 is shown with one or more input/output ("I/O") interfaces 618. An I/O interface 618 can receive input from input devices or provide output to output devices. An input device 614 can include any device or group of devices suitable for receiving visual, auditory, or other suitable input that controls or affects the operations of the processing device 602. Non-limiting examples of the input device 614 include a touchscreen, a mouse, a keyboard, a microphone, a separate mobile computing device, etc. A presentation device 616 can include any device or group of devices suitable for providing visual, auditory, or other suitable sensory output. Non-limiting examples of the presentation device 616 include a touch-screen, a monitor, a speaker, a separate mobile computing device, etc.

Although FIG. 6 depicts the input device 614 and the presentation device 616 as being local to the computer system 600, other implementations are possible. For instance, in some embodiments, one or more of the input device 614 and the presentation device 616 can include a remote client-computing device that communicates with computing system 600 via the network interface device 612 using one or more data networks described herein.

Embodiments may comprise a computer program that embodies the functions described and illustrated herein, wherein the computer program is implemented in a computer system that comprises instructions stored in a machine-readable medium and a processing device that executes the instructions to perform applicable operations. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 7:
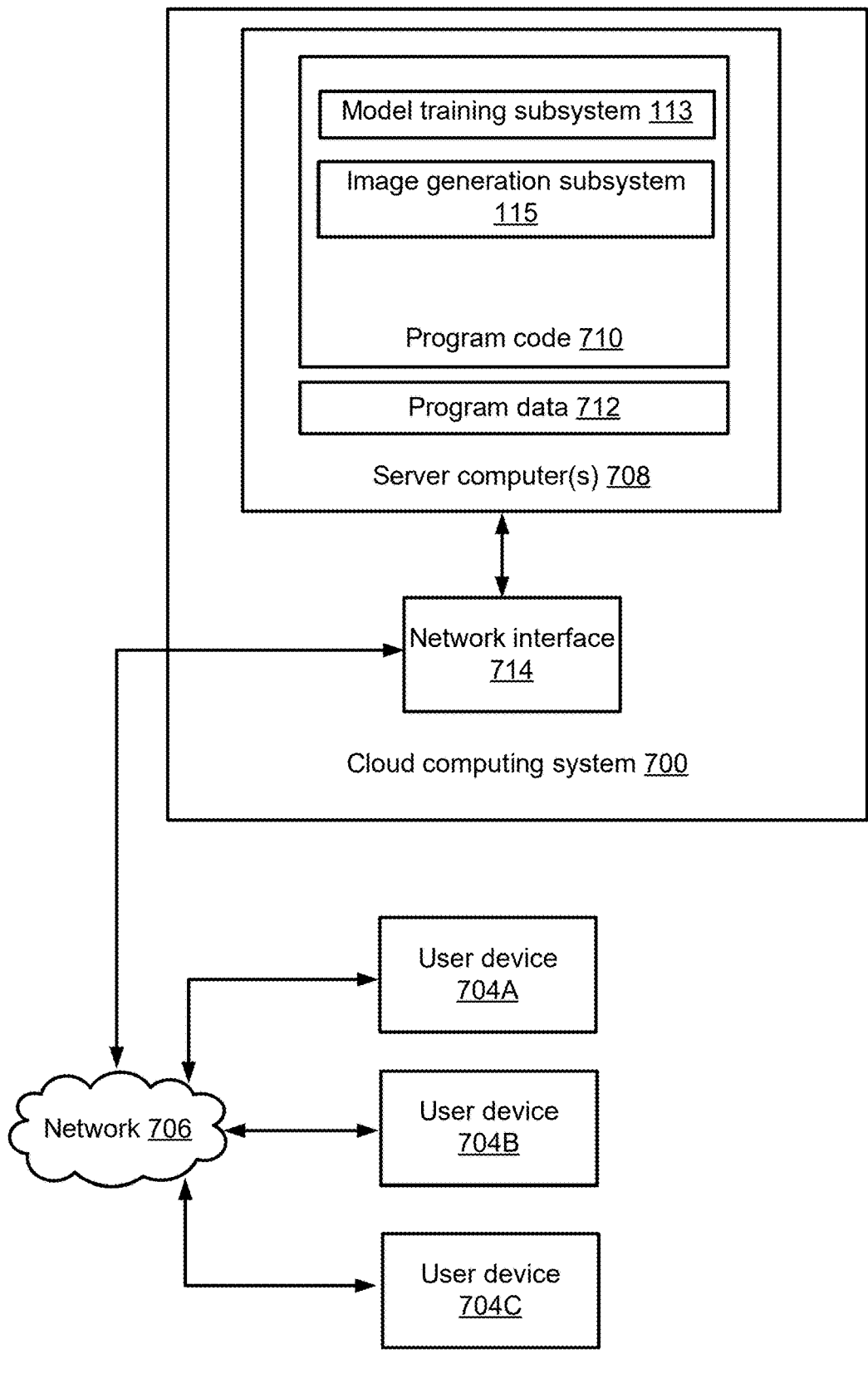
FIG. 7 depicts an example of a cloud computing system that performs certain operations described herein, according to certain embodiments disclosed herein.

In some embodiments, the functionality provided by computer system 600 may be offered as cloud services by a cloud service provider. For example, FIG. 7 depicts an example of a cloud computer system 700 offering a service for generating a stylized image 108 based on an input image 102 and a target style text 101, that can be used by a number of user subscribers using user devices 704A, 704B, and 704C across a data network 706. The cloud computer system 700 performs the processing to provide the service for generating a stylized image 108 based on an input image 102 and a target style text 101. The cloud computer system 700 may include one or more remote server computers 708.

The remote server computers 708 include any suitable non-transitory computer-readable medium for storing program code 710 (e.g., the image generation subsystem 113 and the model training subsystem 115 of FIG. 1) and program data 712, or both, which is used by the cloud computer system 700 for providing the cloud services. A computer-readable medium can include any electronic, optical, magnetic, or other storage device capable of providing a processing device with executable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1208 can include volatile memory, non-volatile memory, or a combination thereof.

One or more of the server computers 708 execute the program code 710 that configures one or more processing devices of the server computers 708 to perform one or more of the operations that execute a service for generating a stylized image 108 based on an input image 102 and a target style text 101 As depicted in the embodiment in FIG. 7, the one or more servers providing the service for generating a stylized image 108 based on an input image 102 and a target style text 101 may implement the image generation subsystem 113 and the model training subsystem 115. Any other suitable systems or subsystems that perform one or more operations described herein (e.g., one or more development systems for configuring an interactive user interface) can also be implemented by the cloud computer system 700.

In certain embodiments, the cloud computer system 700 may implement the services by executing program code and/or using program data 712, which may be resident in a memory component of the server computers 708 or any suitable computer-readable medium and may be executed by the processing devices of the server computers 708 or any other suitable processing device.

In some embodiments, the program data 712 includes one or more datasets and models described herein. In some embodiments, one or more of data sets, models, and functions are stored in the same memory component. In additional or alternative embodiments, one or more of the programs, data sets, models, and functions described herein are stored in different memory components accessible via the data network 706.

The cloud computer system 700 also includes a network interface device 714 that enable communications to and from cloud computer system 700. In certain embodiments, the network interface device 714 includes any device or group of devices suitable for establishing a wired or wireless data connection to the data networks 706. Non-limiting examples of the network interface device 714 include an Ethernet network adapter, a modem, and/or the like. The service for generating a stylized image 108 based on an input image 102 and a target style text 101 is able to communicate with the user devices 704A, 704B, and 704C via the data network 706 using the network interface device 714.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting. While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method performed by one or more computing devices associated with an image generation system, comprising:
   accessing an input image displayed on a user interface;
   receiving, via the user interface, a target style text defining a target style for a stylized image to be generated based on the input image and a request to generate the stylized image;
   generating the stylized image, wherein generating the stylized image comprises applying a text guided image generation model to the input image and the target style text, wherein the text guided image generation model minimizes a loss between a first relationship between the generated stylized image and a set of style templates and a second relationship between the target style text and the set of style templates; and
   displaying, via the user interface responsive to receiving the request, the generated stylized image.

2. The method of claim 1, wherein applying the text guided image generation model comprises:
   accessing a style basis set defining a set of styles for generating stylized images; and
   generating, based on the style basis set and the target style text, a style aligned text score, wherein the loss is determined based on the style aligned target text score.

3. The method of claim 2, wherein applying the text guided image generation model comprises:
   generating a set of style CLIP codes by generating, for each style of the set of styles and using a contrastive language-image pretraining (CLIP) encoder, a respective target style embedding; and
   generating a style tensor from the style CLIP codes, wherein the style aligned target text score is generated by projecting the target style embeddings over the style tensor.

4. The method of claim 1, wherein applying the text guided image generation model comprises:
   generating, from the stylized image, a set of patches;
   for each patch of the set of patches, generating a respective patch embeddings;
   generating, for the set of patches, a similarity score by encoding the patch embeddings in the style tensor.

5. The method of claim 4, wherein applying the text guided image generation model comprises determining the loss, wherein determining the loss comprises applying a loss function to the similarity score.

6. The method of claim 1, wherein the target style defines a set of features for the stylized image comprising one or more of one or more of color, texture, line, space, shape, value, or form.

7. The method of claim 1, wherein the target style text comprises a natural language description of the target style.

8. A system comprising:

a memory component; and a processing device coupled to the memory component, the processing device to perform operations comprising:

receiving, via a user interface, a target style text defining a target style for a stylized image to be generated based on an input image displayed via the user interface, and a request to generate the stylized image, the target style defining a set of features for the stylized image comprising one or more of one or more of color, texture, line, space, shape, value, or form;

generating the stylized image, wherein generating the stylized image comprises applying a text guided image generation model to the input image and the target style text, wherein the text guided image generation model minimizes a loss between a first relationship between the generated stylized image and a set of style templates and a second relationship between the target style text and the set of style templates; and displaying, via the user interface responsive to receiving the request, the generated stylized image.

9. The system of claim 8, wherein applying the text guided image generation model comprises:

accessing a style basis set defining a set of styles for generating stylized images; and generating, based on the style basis set and the target style text, a style aligned text score, wherein the loss is determined based on the style aligned target text score.

10. The system of claim 9, wherein applying the text guided image generation model comprises:

generating a set of style CLIP codes by generating, for each style of the set of styles and using a contrastive language-image pretraining (CLIP) encoder, a respective target style embedding; and generating a style tensor from the style CLIP codes, wherein the style aligned target text score is generated by projecting the target style embeddings over the style tensor.

11. The system of claim 8, wherein applying the text guided image generation model comprises:

generating, from the stylized image, a set of patches;

for each patch of the set of patches, generating a respective patch embeddings;

generating, for the set of patches, a similarity score by encoding the patch embeddings in the style tensor.

12. The system of claim 11, wherein applying the text guided image generation model comprises determining the loss, wherein determining the loss comprises applying a loss function to the similarity score.

13. The system of claim 8, wherein the target style text comprises a natural language description of the target style.

14. A non-transitory computer-readable medium storing executable instructions, which when executed by a processing device, cause the processing device to perform operations comprising:

generating, based on an input image displayed via a user interface and a target style text received via the user interface defining a style for a stylized image for the input image, the stylized image, wherein generating the stylized image comprises applying a text guided image generation model to the input image and the target style text, wherein the text guided image generation model minimizes a loss between a first relationship between the generated stylized image and a set of style templates and a second relationship between the target style text and the set of style templates; and displaying, via the user interface, the generated stylized image.

15. The computer-readable medium of claim 14, wherein the target style defines a set of features for the stylized image comprising one or more of one or more of color, texture, line, space, shape, value, or form.

16. The computer-readable medium of claim 14, wherein applying the text guided image generation model comprises:

accessing a style basis set defining a set of styles for generating stylized images; and generating, based on the style basis set and the target style text, a style aligned text score, wherein the loss is determined based on the style aligned target text score.

17. The computer-readable medium of claim 16, wherein applying the text guided image generation model comprises:

generating a set of style CLIP codes by generating, for each style of the set of styles and using a contrastive language-image pretraining (CLIP) encoder, a respective target style embedding; and generating a style tensor from the style CLIP codes, wherein the style aligned target text score is generated by projecting the target style embeddings over the style tensor.

18. The computer-readable medium of claim 14, wherein applying the text guided image generation model comprises:

generating, from the stylized image, a set of patches;

for each patch of the set of patches, generating a respective patch embeddings;

generating, for the set of patches, a similarity score by encoding the patch embeddings in the style tensor.

19. The computer-readable medium of claim 18, wherein applying the text guided image generation model comprises determining the loss, wherein determining the loss comprises applying a loss function to the similarity score.

20. The computer-readable medium of claim 14, wherein the target style text comprises a natural language description of the target style.

\* \* \* \* \*